(12) United States Patent
Shatters (10) Patent No.: US 9,464,403 B2
(45) Date of Patent: Oct. 11, 2016

(54) METHOD AND SYSTEM FOR ESTIMATING PAYLOAD WEIGHT WITH TILT POSITION COMPENSATION

(71) Applicant: Caterpillar Inc., Peoria, IL (US)

(72) Inventor: Aaron Shatters, Montgomery, IL (US)

(73) Assignee: Caterpillar Inc., Peoria, IL (US)

( * ) Notice: Subject to any disclaimer, the term of this patent is extended or adjusted under 35 U.S.C. 154(b) by 173 days.

(21) Appl. No.: 14/299,402

(22) Filed: Jun. 9, 2014

(65) Prior Publication Data
US 2015/0354177 A1    Dec. 10, 2015

(51) Int. Cl.
| | | |
|---|---|---|
| G01G 23/01 | (2006.01) | |
| E02F 3/26 | (2006.01) | |
| E02F 3/34 | (2006.01) | |
| E02F 3/42 | (2006.01) | |
| G01G 19/10 | (2006.01) | |
| E02F 9/26 | (2006.01) | |
| G01G 19/08 | (2006.01) | |

(52) U.S. Cl.
CPC .............. *E02F 3/422* (2013.01); *E02F 3/3411* (2013.01); *E02F 9/264* (2013.01); *G01G 19/083* (2013.01); *G01G 19/10* (2013.01); *G01G 23/01* (2013.01)

(58) Field of Classification Search
CPC ........... E02F 9/26; E02F 9/264; E02F 3/422; E02F 3/3411; G01G 19/083; G01G 19/10; G01G 23/01
See application file for complete search history.

(56) References Cited

U.S. PATENT DOCUMENTS

| | | | | |
|---|---|---|---|---|
| 4,230,196 A * | 10/1980 | Snead | .................. | E02F 3/3411 177/141 |
| 4,499,960 A * | 2/1985 | Ehrich | ..................... | G01G 5/04 177/1 |
| 4,919,222 A * | 4/1990 | Kyrtsos | .................... | G01G 5/04 177/139 |
| 5,067,572 A * | 11/1991 | Kyrtsos | .................... | E02F 9/264 177/139 |
| 5,070,953 A * | 12/1991 | Kyrtsos | .................... | E02F 9/264 177/139 |
| 5,105,896 A * | 4/1992 | Kyrtsos | .................... | E02F 9/264 177/139 |
| 5,178,226 A * | 1/1993 | Bowman | ................... | B65F 3/04 177/139 |
| 5,666,295 A * | 9/1997 | Bruns | ................... | B66F 17/003 177/139 |
| 5,714,719 A | 2/1998 | Otsuka et al. | | |
| 6,552,279 B1 * | 4/2003 | Lueschow | ............. | G01G 19/10 177/141 |
| 7,480,579 B2 | 1/2009 | Lueschow et al. | | |
| 8,126,619 B2 * | 2/2012 | Corder | ................... | G01G 19/10 187/393 |
| 8,271,229 B2 | 9/2012 | Hsu et al. | | |
| 8,428,832 B2 | 4/2013 | Marathe et al. | | |
| 8,515,627 B2 | 8/2013 | Marathe et al. | | |
| 8,560,181 B2 | 10/2013 | Ekvall et al. | | |
| 9,200,432 B1 * | 12/2015 | Shatters | .................... | E02F 9/24 |
| 2006/0074578 A1 * | 4/2006 | Lueschow | ............ | G01G 19/083 702/101 |
| 2006/0100808 A1 * | 5/2006 | Lueschow | ............. | G01G 19/10 702/101 |
| 2009/0127031 A1 * | 5/2009 | Corder | ................... | G01G 19/10 187/393 |
| 2010/0161185 A1 * | 6/2010 | Marathe | .................. | E02F 9/264 701/50 |
| 2014/0060939 A1 * | 3/2014 | Eppert | .................... | E02F 3/342 177/1 |
| 2014/0291038 A1 * | 10/2014 | Hague | ................... | G01G 19/10 177/1 |

* cited by examiner

*Primary Examiner* — Randy W Gibson
(74) *Attorney, Agent, or Firm* — Leydig, Voit & Mayer, Ltd.

(57) ABSTRACT

A system for estimating the weight of a payload in a bucket is provided. The system includes a pivotable lift linkage, a lift cylinder assembly, a pivotable tilt linkage and a tilt cylinder assembly. A payload measurement system receives pressure data relating to a pressure in the lift cylinder assembly and angular position data relating to an angular position of the bucket relative. The payload measurement system is configured to estimate weight of a payload in the bucket based on the pressure data, the angular position data and predetermined physical parameters relating to the tilt linkage and lift linkage that are useable to characterize an effect of a portion of the payload that is supported by the tilt cylinder assembly.

6 Claims, 4 Drawing Sheets

METHOD AND SYSTEM FOR ESTIMATING PAYLOAD WEIGHT WITH TILT POSITION COMPENSATION

TECHNICAL FIELD

This patent disclosure relates generally to loader and, more particularly, to a method and system for estimating the payload weight of a loader.

BACKGROUND

A loader is a construction machine typically used to transport a load of material, such as aggregate construction or mining material, from one place, such as a pile of stored material, to another, such as a truck used for hauling the material to another location. For example, a loader may be used to load a dump truck full of material or to transport material from a pile to a specific place where it is used, such as trench. Typically, loaders are wheeled or tracked vehicles having a large bucket on one end and include hydraulics or other mechanisms for raising and lowering the bucket and tilting the bucket. However, a loader can also be a stationary machine that is immobile, but used to transport a load from one place to another, for example from a pile to the bed of a nearby dump truck. Generally, a loader is any device capable of using a bucket or other appropriate support structure to transport a payload from one place to another place.

Often, it is desirable to know the weight of a payload. For example, dump trucks used on the highway typically must abide by laws restricting how much weight they can carry and the restrictions are typically determined by a government highway authority. Depending on the density of the material loaded into a truck, it is possible to load more than the maximum allowed amount into the bed of the truck. In addition, loading too much weight into a truck can also cause premature wear to the truck's suspension, drive train, and other parts affected by weight. In other instances, it may be desirable to know the weight of the payload. For example, when material is sold according to weight, knowing an amount of material loaded into a truck can provide a basis to calculate a cost of the loaded material.

To determine the weight of a payload, loaders may include payload measurement systems. Typically, payload measurement systems utilize one or more sensors that measure the hydraulic pressures present in the hydraulic cylinders used for lifting the bucket up and down. The payload measurement systems then use the sensed pressures to estimate the weight of the payload in the bucket. However, one problem with such payload measurement systems is that they fail to take into account the impact that the hydraulic tilt cylinders have on supporting the payload. The contribution of the hydraulic tilt cylinders in supporting the payload in the bucket varies based on the tilt position of the bucket. Because payload measurement systems do not take this effect into account, the estimate of the payload weight can be inaccurate.

SUMMARY

In one aspect, the disclosure describes a system for estimating the weight of a payload in a bucket of a machine. The system includes a pivotable lift linkage pivotally attached at a first end to the bucket such that the bucket is pivotable relative to the lift linkage about a first axis and a lift cylinder assembly connected the lift linkage for pivoting the lift linkage to move the bucket between raised and lowered positions. A pivotable tilt linkage is pivotally connected to the lift linkage and connected to the bucket. A tilt cylinder assembly is connected to tilt linkage for pivoting the tilt linkage such that the bucket pivots relative to the lift linkage about the first axis. A payload measurement system receives pressure data relating to a pressure in the lift cylinder assembly and angular position data relating to an angular position of the bucket relative to the first axis. The payload measurement system is configured to estimate weight of a payload in the bucket based on the pressure data, the angular position data and predetermined physical parameters relating to the tilt linkage and lift linkage that are useable to characterize an effect of a portion of the payload that is supported by the tilt cylinder assembly.

In another aspect, the disclosure describes a method for estimating the weight of a payload in a machine. The machine includes a chassis, a bucket, a lift linkage pivotally attached at a first end to the chassis and a second end to the bucket such that the bucket is pivotable relative to the lift linkage about a first axis. A lift cylinder assembly is connected to the chassis and the lift linkage for pivoting the lift linkage relative to the chassis. A tilt linkage is pivotally connected at a first end to the lift linkage and connected at a second end to the bucket. A tilt cylinder assembly is connected to the chassis and the tilt linkage for pivoting the bucket relative to the lift linkage about the first axis. The method includes the step of monitoring pressure data relating to a pressure in the lift cylinder assembly. Angular position data relating to an angular position of the bucket relative to the first axis is also monitored. An initial estimate of the weight of a payload in the bucket is determined based on the pressure data. A tilt compensation that characterizes an effect of a portion of the payload that is supported by the tilt cylinder assembly is determined based on the angular position data and predetermined physical parameters relating to the tilt linkage and the lift linkage. The initial estimate of the weight of the payload in the bucket is adjusted using the tilt compensation.

In yet another aspect, the disclosure describes a machine including a chassis and a bucket for holding a payload. A lift linkage is pivotally attached at a first end to the bucket such that the bucket is pivotable relative to the lift linkage about a first axis and pivotally attached at a second end to the chassis. A lift cylinder assembly is connected to the chassis and the lift linkage for pivoting the lift linkage relative to the chassis to move the bucket between raised and lowered positions. A tilt linkage is pivotally connected at a first end to the lift linkage and connected at a second end to the bucket. A tilt cylinder assembly is connected to the chassis and to the tilt linkage for pivoting the tilt linkage such that the bucket pivots relative to the lift linkage about the first axis. A payload measurement system receives pressure data relating to a pressure in the lift cylinder assembly and angular position data relating to an angular position of the bucket relative to the first axis. The payload measurement system is configured to determine an estimate of the weight of a payload in the bucket based on the pressure data, determine a tilt compensation that characterizes an effect of a portion of the payload that is supported by the tilt cylinder assembly based on the angular position data and predetermined physical parameters relating to the tilt linkage and the lift linkage and adjusts the estimate of the weight of the payload in the bucket using the tilt compensation.

DETAILED DESCRIPTION

Figure 1:
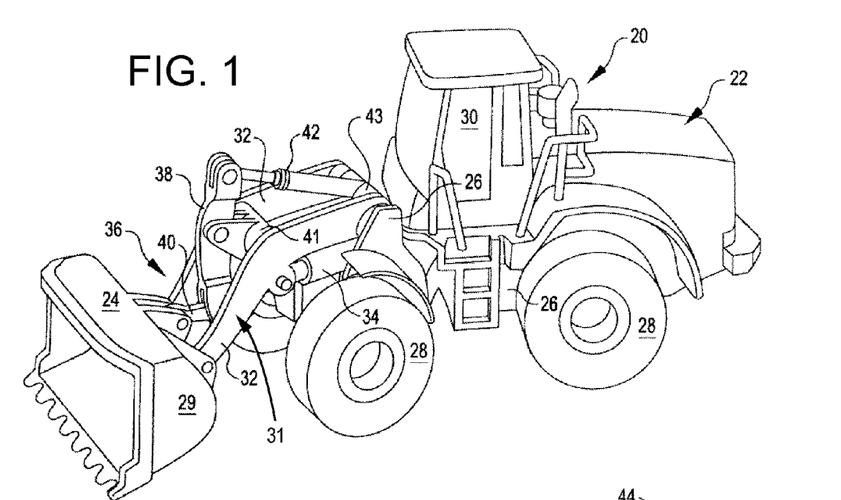
FIG. 1 is a side perspective view of a loader according to the present disclosure.

This disclosure generally relates to a method and system for estimating the weight of a payload carried by a loader. With particular reference to FIG. 1, an exemplary embodiment of a loader 20 is shown. The illustrated loader 20 includes a vehicle portion 22 and a bucket 24 connected on a front side of the vehicle portion 22. The vehicle portion 22 may include a chassis 26 which may support various parts of the loader 20, either directly or indirectly, such as an engine, body panels, hydraulic systems, and other parts. In the illustrated embodiment, the chassis 26 itself is supported by a plurality of wheels 28 rotatably connected to the chassis 26. The vehicle portion 22 may include a cab 30 attached to an upper middle section of the chassis 26. The cab 30 may be an enclosed structure having windows on lateral sides and in which an operator of the loader 20 may sit and operate the loader 20. In other embodiments, the loader may be configured to be operated from a remote location.

Figure 2:
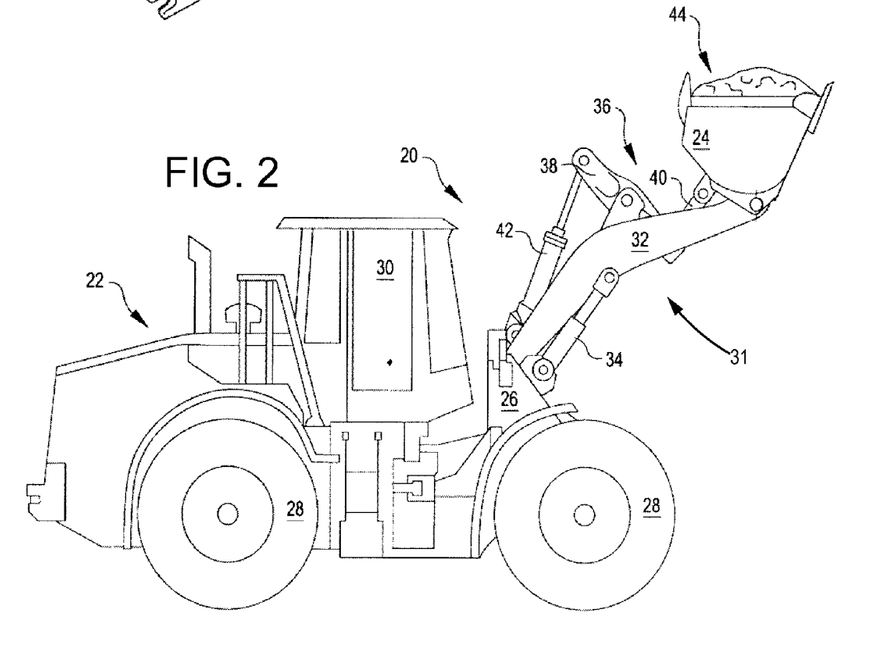
FIG. 2 is a side view of the loader of FIG. 1 with the bucket in a raised position.

In the illustrated embodiment, the bucket 24 comprises two parabolic or similarly-shaped plates 29 having a plate curved about the perimeter of each plate and extending horizontally between them so as to form a concave enclosure opening away from the loader 20. In general, the bucket may have any shape capable of holding a payload. FIG. 2 shows the loader 20 with a payload 44 in the bucket 24 and the bucket 24 in a raised position.

For lifting the bucket, the bucket 24 may be attached to the vehicle portion 22 by a lift linkage 31 comprising a pair of parallel arms 32. The parallel arms may extend between the bucket 24 and the chassis 26, such as between a rear portion of the bucket 24 and a location on the chassis 26 immediately in front of the cab 30. Each arm 32 may be pivotally attached to the chassis 26 at one end, and pivotally attached to a rear portion of the bucket 24 on an opposite end. For each arm 32, a hydraulic lift cylinder assembly 34 or other actuator for pivoting the arm 32 relative to the chassis 26 is provided that may have a first end pivotally attached to the chassis 26 beneath the arm 32 and a second end pivotally attached to the arm 32 at a point between the bucket 24 and the location of the attachment of the arm 32 to the chassis 26.

The lift cylinder assembly 34 may be configured such that extension and retraction of the lift cylinder pivots the lift linkage thereby moving the bucket 24 between raised (see FIG. 2) and lowered positions (see FIG. 2). More specifically, the lift cylinder assembly 34 may include an actuator—such as a hydraulic cylinder including a rod enclosed by a casing, the rod able to extend out of or retract into the casing—able to increase and decrease its length, thereby causing its respective arm 32 to pivot upwardly about its respective attachment to the chassis 26, or retracting its length thereby forcing the arm 32 to rotate downwardly about its attachment to the chassis 26. As the arms 32 rotate about their respective attachments to the chassis 26, the bucket 24 is raised and lowered accordingly. In general, any actuator or other mechanism capable of lifting the arms 32 may be used as an alternative to or in addition to the lift cylinder assemblies 34.

Figure 3:
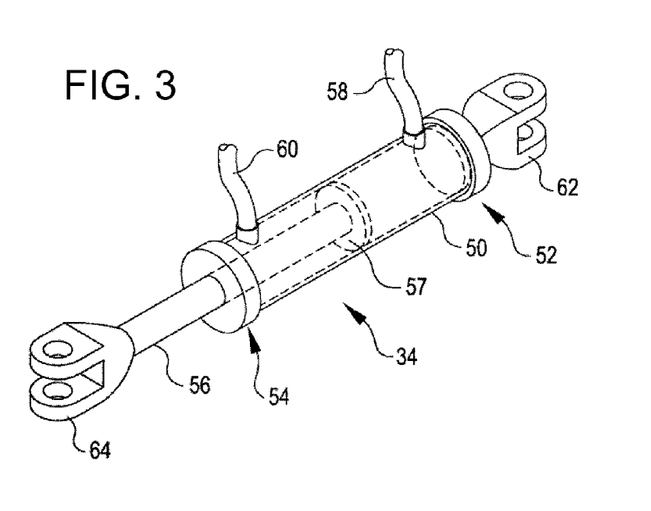
FIG. 3 is a schematic, side perspective view of a hydraulic cylinder of the loader of FIG. 1.

FIG. 3 shows a representation of an exemplary lift cylinder assembly 34. The lift cylinder assembly 34 includes a hollow casing 50 with a capped head-end 52 and a rod-end 54 through which an elongate rod 56 extends. In this case, a hydraulic head-end hose 58 is fluidly connected to the interior of the casing 50 at the head-end 52, while a hydraulic rod-end hose 60 is fluidly connected to the interior of the casing 50 at the rod-end 54. The end of the rod 56 inside the casing 50 includes a plunger 57 having a cross section approximately equal to the interior diameter of the casing 50 so as to fit tightly inside the interior of the casing 50. In this manner, a pressure differential across the head-end hose 58 and rod-end hose 60 can cause the rod 56 to move relative to the casing 50. For instance, if there is higher pressure in the head-end hose 58 than in the rod-end hose 60, hydraulic fluid will force the plunger 57 towards the rod-end 54 of the cylinder 34, thereby causing the rod 56 to exit the casing 50 about its length. Hydraulic fluid in the rod-end 54 of the lift cylinder assembly 34 exits the rod-end 54 through the rod-end hose 60 to a control valve (not shown) or other component of the hydraulic system of the loader 20. Similarly, if the pressure in the rod-end hose 60 is higher than in the head-end hose 58, the plunger 57 is forced into the casing 50 away from the rod-end 54 towards the head-end 52 causing the rod 56 to retract into the casing 50.

For varying the angular position of the bucket 24 relative to the arms 32, the bucket 24 may be connected to the arms 32 by a tilt linkage 36. In particular, the tilt linkage may be configured to be operable to pivot the bucket 24 relative to the lift linkage 31 about an axis defined by its pivotal connection (pivot pin B in FIG. 4) to the lift linkage. The tilt linkage 36 may include a major tilt arm 38 and a minor tilt arm 40. The major tilt arm 38 may be rotatably connected at its middle portion to a first cross member 41 that extends horizontally between the corresponding middle portions of the arms 32. A hydraulic tilt cylinder assembly 42 or other actuator for actuating the angular position of the bucket 24 relative to the booms 32 may rotatably connect an upper end of the major tilt arm 38 to a cross member 43 of the chassis 26 that extends between the arms 32 near their connections to the chassis 26. Like the lift cylinder assembly 34, the tilt cylinder assembly 42 may include an actuator able to increase and decrease its length, thereby rotating the major tilt arm 38 about its connection to the first cross member 41. The tilt cylinder assembly 42 may be functionally identical to the lift cylinder assembly 34, although it may have different dimensions such as a different length or diameter. Consequently, reference numerals for the lift cylinder assembly 34 will be used to reference respective parts of the tilt cylinder assembly 42.

As best shown in FIGS. 1 and 2, the end of the major tilt arm 38 opposite the tilt cylinder assembly 42 may be connected to the bucket 24 by the minor tilt arm 40, which extends from and rotatably connects to a rear portion of the bucket 24 above the connections of the bucket 24 to the arms 32. According to one embodiment, when the tilt cylinder assembly 42 extends, the tilt linkage 36 causes the bucket 24 to pivot relative to the lift linkage 31 with a lower front edge of the bucket 24 rotating upwardly. Similarly, when the tilt cylinder assembly 42 retracts, the tilt linkage 36 causes the bucket 24 to tilt with the lower front edge of the bucket 24 rotating downwardly.

Data associated with the bucket 24 and the payload 44 may be gathered through sensors on the linkage connecting the bucket 24 to the chassis 26, such as through sensors associated with the lift cylinder assembly 34. For example, pressures inside of the head-end 52 and rod-end 54 of each lift cylinder assembly 34 may be determined by taking measurements from a suitable pressure sensor. Likewise, the displacement of the rod 56 of each the lift cylinder assembly 34 and tilt cylinder assembly 42 can also be measured by appropriate sensors. For example, the plunger 57 may include a magnetic element that is sensed by a sensor (not shown) located on the casing 50. The sensor may include several sensing elements that react when the magnetic element is in close proximity, thereby indicating the location of the magnetic element relative to the casing 50 and, therefore, the displacement of the rod 56 relative to the casing 50. Generally, any mechanism or mechanisms for measuring the head-end 52 and rod-end 54 pressures, and rod 56 displacement can be used.

In addition, the loader 20, as shown, includes two identical lift cylinder assemblies 34 that act in concert to raise and lower the arms 32. Consequently, pressure and displacement measurements need only be taken from one of the lift cylinder assemblies 34 in order to provide data about the bucket 24. Nevertheless, pressure and/or displacement measurements can be taken for both lift cylinder assemblies 34 in order to increase the accuracy of the measurements taken. For instance, if the loader 20 is on an uneven surface, the head-end 52 pressures in each lift cylinder assembly 34 can be unequal and the pressures can be averaged or otherwise used. In addition, taking measurements from more than one lift cylinder assembly 34 also can be used in order to provide redundancy so that sensors for one lift cylinder assembly 34 provide a reference against which to check the function of sensors of the other lift cylinder assembly 34 and so that, should sensors in one lift cylinder assembly 34 fail, sensors in the other lift cylinder assembly 34 can be used.

Figure 5:
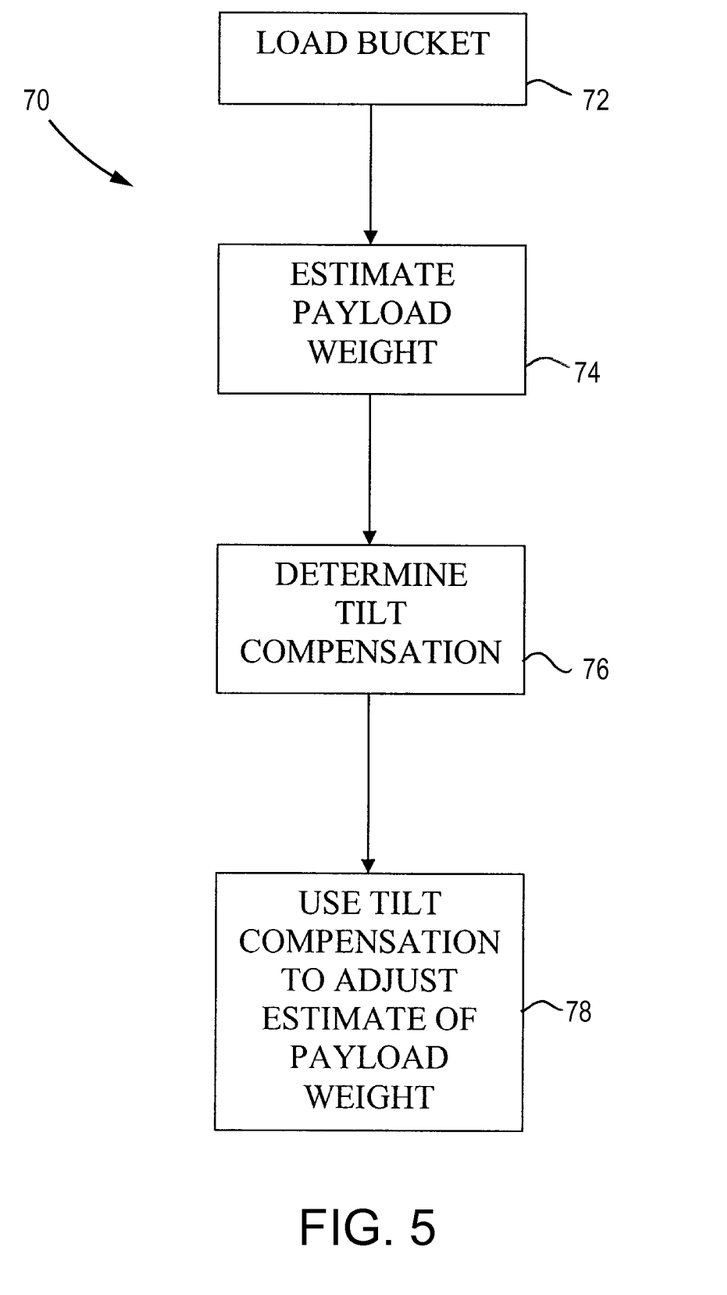
FIG. 5 is a schematic flow diagram of an exemplary method for estimating the weight of a payload in a bucket of a loader according to the present disclosure.

FIG. 5 shows a schematic flow diagram of a payload measurement system 70 for estimating the weight of the payload 44. It will be appreciated that each program, module, and functional computational unit described herein, and each step executed by the system 70, is implemented in an embodiment by a computer or computing device (generically "computer") using one or more processors to read computer-executable instructions from a computer-readable medium and executing said instructions or causing them to be executed. The computer-readable medium is a physical fixed medium such as a magnetic or optically readable (and potentially writable) disc, circuit, array, or other physically tangible element. In an alternative embodiment, "transient computer-readable media" may be used additionally or alternatively. Such media include radio and optical transmissions (generically "electromagnetic transmissions"), audio transmissions, whether human-perceivable or not, and so on. It will be appreciated that "computer-readable media" are distinct from "transient computer-readable media."

The payload measurement system 70 begins the weight estimation at a loading step 72 during which an operator of the loader 20 loads the payload 44 into the bucket 24. Typically, loading the payload 44 into the bucket 24 involves lowering the bucket 24 to the ground and tilting the bucket 24 so that a bottom edge of the bucket 24 is approximately parallel to the ground. An operator of the loader 20 drives the loader 20 toward a pile of material such as gravel, rock, dirt or other material with the bucket 24 in this configuration and gradually lifts the booms 32 and curls the bucket 24 as the bucket enters the pile, thereby causing gravel in the pile to be scooped by the bucket 24. However, other ways of loading the payload 44 into the bucket 24 can also be practiced, such as loading the payload 44 into the bucket 24 manually using hand shovels or by dropping the payload 44 into the bucket 24 using another machine, such as an excavator. Generally, any method of loading a payload 44 into the bucket 24 can be used.

Once the payload 44 is loaded into the bucket 24, at a load estimation step 74, the payload measurement system 70 determines an initial estimate of the weight of the payload 44. To this end, the system 70 may monitor hydraulic pressure in one or both of the lift cylinder assemblies 34 as well as the extension of one or both of the lift cylinder assemblies, i.e. displacement of the rods 56 of the lift cylinder assembly 34. The system 70 may convert the pressures and positions measured into an estimated weight by referencing the pressures and positions measured in a table stored electronically in the system 70. However, as discussed further below, the payload measurement system 70 can use formulas derived from geometric properties of the loader 20. Other methods for translating measured physical data into an estimated weight could also be used. Tables stored electronically in the payload measurement system 70 can be determined empirically, using measurements taken with payloads of known weight or by the use of well-known physical formulas.

Because the payload weight estimate step 74 only takes into account the lift cylinder assembly 34 pressure, the payload weight estimate produced in step 74 can be inaccurate. In particular, the tilt cylinder assembly 42 can produce a force that impacts the support of the payload in the bucket 24. For example, with reference to FIG. 4, the force exerted by the tilt cylinder assembly 42 on the E-pin may result in a moment around the A-pin tending to push the lift linkage arms 32 up or down. This moment around the A-pin offsets the force required by the lift cylinder assembly 34 to suspend the payload. Since the payload measurement system may only measure pressure in the lift cylinder assembly 34, the force offset produced by the tilt cylinder assembly 42, if unaccounted for, can result in an inaccurate estimate of the payload weight. Accordingly, in step 76, the system can determine a tilt position compensation or correction that characterizes the effect that the force applied by the tilt cylinder assembly 42 has on the support of the payload by the lift cylinder assembly 34.

To determine this tilt compensation in step 76, the payload measurement system 70 may monitor data relating to the tilt or angular position of the bucket, such as can be calculated using the extension of the tilt cylinder assembly (i.e. displacement of the rod 56 of the tilt cylinder assembly) and the extension of the lift cylinder assembly (i.e. displacement of the rod 56 of the tilt cylinder assembly) from one or more sensors. The payload measurement system 70 may then determine the tilt compensation effect that the tilt position of the bucket has on the weight calculation by using an algorithm programmed into the payload measurement system that uses the data regarding the angular position of the bucket 24 relative to the lift linkage 31 (e.g., the tilt cylinder assembly 42 and lift cylinder assembly 34 extensions) and predetermined physical parameters associated with the lift and tilt linkages 31, 36 for the bucket 24. The predetermined physical parameters that characterize the impact of the bucket angle on the weight calculation can be programmed into the payload measurement system 70. According to one example, the predetermined physical parameters used in tilt compensation algorithm may include the geometric properties of the arms 32, lift cylinder assembly 34, the tilt linkage 36, the tilt cylinder assembly 42 and/or the bucket 24. In step 78, the payload measurement system 70 can use the tilt effect compensation determined in step 76 to adjust the initial estimate of the payload weight from step 74.

Figure 6:
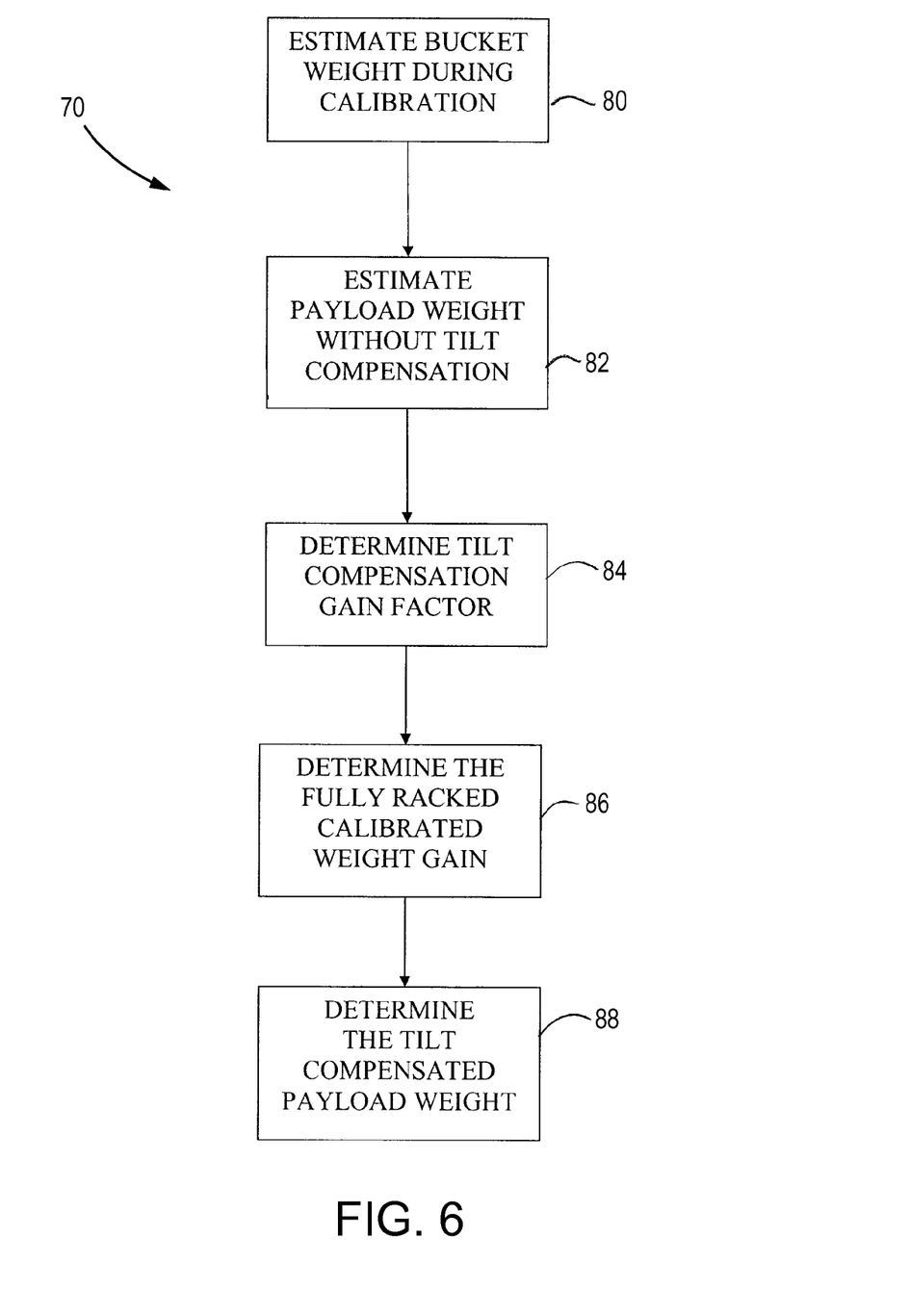
FIG. 6 is a schematic flow diagram of an exemplary method for determining a tilt compensated payload weight estimate according to the present disclosure.

A more detailed example of how the tilt compensation may be determined is shown in the schematic flow diagram of FIG. 6. In a first step 80, the payload measurement system 70 determines an estimate for the weight of the empty bucket 26. According to one embodiment, this could be done by programming a predetermined empty bucket weight into the payload measurement system 70 that is based on the weight of the actual bucket 26 used in the particular machine with which the payload measurement system is being used. Alternatively, the payload measurement system 70 may calculate an estimate of the empty bucket weight based one or more of the predetermined physical parameters associated with the machine such as the geometric properties of the arms 32, lift cylinder assembly 34, the tilt linkage 36, the tilt cylinder assembly 42 and/or the bucket 24.

According to one example, the empty bucket weight may be estimated by the payload measurement system 70 using a calibration procedure and predetermined physical parameters associated with the lift linkage 31 and the lift cylinder assembly 34. From kinematic models of a given lift linkage, the following can be calculated for a given lift cylinder assembly 34 extension (e.g., 50% extended) and a given tilt cylinder assembly 42 extension (e.g., fully racked or fully extended) under friction-less conditions (i.e., with the bucket 24 in motion being raised and/or lowered): lift cylinder force without a bucket ($F_{L0}$) and change in bucket weight per change in lift cylinder force ($m_0$). From the empty bucket calibration sweep (sweep up and sweep down), the "zero friction" force when the bucket 24 is actually attached to the machine can be calculated from the following equation:

$$F_{L1_{nf}} = \frac{2F_{L1_{raise}}F_{L1_{lower}}}{F_{L1_{raise}} + F_{L1_{lower}}}$$

In which $F_{L1_{nf}}$ is the "zero friction" friction force of the lift cylinder assembly 34 at a predetermined cylinder extension, $F_{L1_{raise}}$ is the lift cylinder assembly 34 force at the predetermined lift cylinder extension when the bucket 24 is being raised during the calibration sweep and $F_{L1_{lower}}$ is the lift cylinder assembly 34 force at the predetermined lift cylinder 42 extension when the bucket 24 is being lowered during the calibration sweep.

From the "no-friction" force at the predetermined lift cylinder assembly 34 extension (e.g., 50%) and tilt cylinder assembly 42 extension (e.g., fully racked), what the weight of the bucket 24 must have been to achieve that force using the following equation can be estimated using the following equation:

$$W_B = m_0 * (F_{L1_{nf}} - F_{L0})$$

In step 82, the payload measurement system 70 may determine an initial estimate of the weight of the payload in the bucket 26 without applying any tilt compensation. As noted above, the payload measurement system may make this determination by looking up an estimated weight from a table stored in the payload measurement system 70 using the pressure and/or extension of the lift cylinder assembly 34. More particularly, during the empty and full bucket calibration procedures, a curve for lift cylinder assembly 34 pressure (force) vs. lift cylinder assembly 34 extension can be determined. For each lift cylinder assembly 34 extension, linear interpolation between the empty bucket curve and full bucket curve can be used in order to determine the payload weight for the measured pressure, at any given lift cylinder assembly extension height. Thus, for any given lift cylinder assembly 34 extension, the payload weight ('W') is linear with lift force ('$F_L$') and can be represented by the following equation:

$$W_{P_{est}} = mF_L + b$$

In step 84, the payload measurement system 70 may determine a tilt compensation gain factor. This gain factor may be stored electronically in the payload measurement system 70 in the form of a table. For example, the gain factor H may be determined as the gain G at the current linkage position minus the gain at the fully racked linkage position based on the following equations:

$$G(\ell_{LiftCyl}, \ell_{TiltCyl}) = \frac{g}{\ell_{LA}} * \left( \frac{\ell_{WB}\ell_{TA}}{\ell_{TBeff}} + \ell_{WA} \right)$$

$$H = G(\ell_{LiftCyl}, \ell_{TiltCyl}) - G(\ell_{LiftCyl}, \ell_{TiltCyl_r})$$

Figure 4:
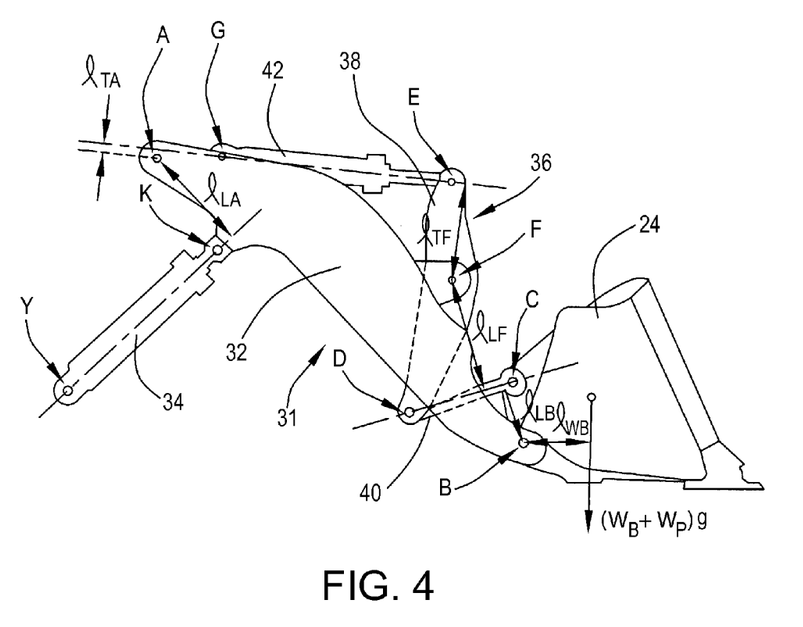
FIG. 4 is a schematic side view of the lift and tilt linkages of the loader of FIG. 1.

In which l refers to various lengths as identified by the subscripts (e.g., length of the tilt cylinder assembly, length of the lift cylinder assembly) and as shown in FIG. 4 and $l_{TBeff}$ is determined based on the following formula:

$$\ell_{TBeff} = \ell_{TF} \frac{\ell_{LB}}{\ell_{LF}}$$

These equations assume that the weight and CG of the linkage itself (not including bucket and payload) does not change with respect to the tilt cylinder assembly 42 extension.

In step 86, the payload measurement system may calculate a fully racked calibrated weight gain. According to one example, the fully racked calibrated weight gain m may be calculated using the following formula:

$$m = \frac{W_{cal}}{F_{L_{cal}} - F_{L_{empty}}}$$

In which $W_{cal}$ is i the weight of the bucket 24 with a predetermined calibrated payload, $F_{Lcal}$ is the force applied by the lift cylinder assembly 34 with the predetermined calibrated payload and $F_{Lempty}$ is the force applied by the lift cylinder assembly 34 with an empty bucket 24.

The payload measurement system 70 may then calculate the estimated tilt compensated weight in step 88. In one example, the estimated tilt compensated weight may be calculated using the following equation:

$$W_P = \frac{W_{P_{est}} - mHW_B}{1 + mH}$$

In which $W_P$ is the weight of the payload $W_{P_{est}}$ is the estimate of the weight of the payload such as produced in step 82, and $W_B$ is the weight of the bucket as determined in step 80.

The foregoing equations are just one example of how the tilt compensated weight may be determined and are based on a payload weight measurement system 70 that is configured to only monitor data relating to pressure in the lift cylinder assembly 34. An alternative arrangement may include one or more pressure sensors associated with the tilt cylinder assembly 42. The sensors may include a sensor for determining the pressure in the head end 52 of the tilt cylinder assembly 42. This sensor could be provided at any location between the control valve for the tilt cylinder assembly 42 and the head end 52 of the tilt cylinder assembly. Additionally, a pressure sensor may be provided for the rod end 54 of the tilt cylinder assembly 42 in order to provide more accurate data regarding the force being produced by the tilt cylinder assembly. In such an arrangement, the determination of the tilt compensation step 76 of FIG. 5 may include using data regarding the pressure in the tilt cylinder assembly along with the predetermined physical parameters of the arms 32, lift cylinder assembly 34, the tilt linkage 36, the tilt cylinder assembly 42 and/or the bucket 24 to determine the effect of the tilt cylinder assembly force on the lift cylinder assembly force. This tilt compensation can then be used by the payload measurement system 70 to adjust the estimated weight of the payload in step 78 of FIG. 5.

INDUSTRIAL APPLICABILITY

The present disclosure is applicable to any loader used in an application in which it would be useful to know the weight of a payload carried by the loader. In a typical situation, the loader 20 is used to transfer aggregate material, such as gravel, rock or dirt, from a stockpile to a truck used for transporting the material to another location. As described above, it is often desirable to know the weight of the material loaded onto the truck. For example, several factors may limit the amount of material that can be loaded onto the truck and/or the loaded material may be sold according to weight. Generally, an operator of the loader 20 scoops several bucket loads of material and dumps the material over sideboards of the truck into a bed of the truck until the desired amount of material is loaded onto the truck.

When the operator scoops material into the bucket 24 of the loader 20 and brings the bucket 24 into a position for loading onto the truck, the payload measurement system 70 may produced a tilt compensated estimate of the payload weight that then may be displayed to an operator of the machine. Other items may also be displayed to the operator of the loader 20, such as the cumulative weight loaded onto the truck, or loaded since a particular point in time. As compared to payload measurement systems that are based entirely on data relating to the lift cylinder assembly, the payload measurement system of the present disclosure produces more accurate estimates of the payload weight by compensating for the angular position of the bucket relative to the lift linkage.

By knowing the weight of the payload 44, the operator of the loader 20 can determine whether to continue loading the truck. For example, if the operator knows that a particular truck is certified to carry ten tons of material in addition to the weight of the truck on public roads, the operator can determine how much weight he or she has already loaded onto the truck at a given time and how much weight he or she can load into the truck at any given time. As another example, if a customer has ordered more material than can be loaded into one truck, such as 1000 tons, the operator of the loader 20 can load several trucks until the operator sees that he or she has loaded the total weight ordered into the several trucks.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for estimating the weight of a payload in a machine, the machine including a chassis, a bucket, a lift linkage pivotally attached at a first end to the chassis and a second end to the bucket such that the bucket is pivotable relative to the lift linkage about a first axis, a lift cylinder assembly connected to the chassis and the lift linkage for pivoting the lift linkage relative to the chassis, a tilt linkage pivotally connected at a first end to the lift linkage and connected at a second end to the bucket, and a tilt cylinder assembly connected to the chassis and the tilt linkage for pivoting the bucket relative to the lift linkage about the first axis, the method comprising the steps of:
monitoring pressure data relating to a pressure in the lift cylinder assembly;
monitoring angular position data relating to an angular position of the bucket relative to the first axis;
determining an initial estimate of the weight of a payload in the bucket based on the pressure data;
determining a tilt compensation that characterizes an effect of a portion of the payload that is supported by the tilt cylinder assembly based on the angular position data and predetermined physical parameters relating to the tilt linkage and the lift linkage; and
adjusting the initial estimate of the weight of the payload in the bucket using the tilt compensation,
wherein an estimated bucket weight is used in determining the tilt compensation based on the following formulas:

$$F_{L1_{nf}} = \frac{2F_{L1_{raise}}F_{L1_{lower}}}{F_{L1_{raise}} + F_{L1_{lower}}} \text{ and}$$

$$W_B = m_0 * (F_{L1_{nf}} - F_{L0}).$$

2. The method of claim 1 wherein a weight gain with the bucket in a fully racked position is used in determining the tilt compensation, wherein the weight gain is based on the following formula:

$$m = \frac{W_{cal}}{F_{L_{cal}} - F_{L_{empty}}}.$$

3. The method of claim 1 wherein a tilt compensation gain factor for a particular angular position of the bucket from a table stored in the payload measurement system is used in determining the tilt compensation, wherein the tilt compensation gain is based on the following formulas:

$$G(\ell_{LiftCyl}, \ell_{TiltCyl}) = \frac{g}{\ell_{LA}} * \left( \frac{\ell_{WB}\ell_{TA}}{\ell_{TBeff}} + \ell_{WA} \right)$$

$$H = G(\ell_{LiftCyl}, \ell_{TiltCyl}) - G(\ell_{LiftCyl}, \ell_{TiltCyl_r}) \text{ and}$$

$$\ell_{TBeff} = \ell_{TF} \frac{\ell_{LB}}{\ell_{LF}}.$$

4. The method of claim 1 wherein the monitoring of the angular position data includes monitoring an extension of the lift cylinder assembly and an extension of the tilt cylinder assembly.

5. The method of claim 1 further including the step of monitoring tilt cylinder pressure data relating to a pressure in the tilt cylinder assembly and the tilt cylinder pressure data is used in determining the tilt compensation.

6. The method of claim 1 wherein determining the initial estimate of the weight of the payload includes looking up the initial weight estimate from a table stored in a payload measurement system using the pressure data.

* * * * *